(12) United States Patent
Jiang et al.

(10) Patent No.: US 7,193,784 B2
(45) Date of Patent: Mar. 20, 2007

(54) NITRIDE MICROLENS

(75) Inventors: Hongxing Jiang, Manhattan, KS (US); Tom N. Oder, Manhattan, KS (US); Jingyu Lin, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 40 days.

(21) Appl. No.: 10/850,524

(22) Filed: May 20, 2004

(65) Prior Publication Data

US 2005/0007670 A1 Jan. 13, 2005

Related U.S. Application Data

(60) Provisional application No. 60/471,861, filed on May 20, 2003.

(51) Int. Cl.
*G02B 3/00* (2006.01)
*G02B 13/14* (2006.01)

(52) U.S. Cl. ..................... 359/642; 359/355

(58) Field of Classification Search ............... 359/642, 359/620
See application file for complete search history.

(56) References Cited

U.S. PATENT DOCUMENTS

| | | |
|---|---|---|
| 4,042,449 A | 8/1977 | Hunt et al. |
| 4,530,736 A | 7/1985 | Mutter |
| 4,689,291 A | 8/1987 | Popovic et al. |
| 5,079,130 A | 1/1992 | Derkits, Jr. |
| 5,286,338 A | 2/1994 | Feldblum et al. |
| 5,370,768 A | 12/1994 | Mersereau et al. |
| 5,605,783 A | 2/1997 | Revelli et al. |
| 5,871,653 A | 2/1999 | Ling |
| 5,871,888 A | 2/1999 | Heremans et al. |
| 6,043,001 A | 3/2000 | Hirsh et al. |
| 6,122,109 A | 9/2000 | Peake et al. |
| 6,165,598 A | 12/2000 | Nelson |
| 6,200,491 B1 | 3/2001 | Zesch et al. |
| 6,259,567 B1* | 7/2001 | Brown et al. ............... 359/668 |
| 6,469,832 B2* | 10/2002 | Yotsuya et al. ............. 359/619 |
| 6,506,543 B1 | 1/2003 | Tseng et al. |
| 6,728,289 B1* | 4/2004 | Peake et al. ................ 372/101 |
| 6,855,371 B2* | 2/2005 | Gier et al. .................. 427/277 |
| 6,870,311 B2* | 3/2005 | Mueller et al. ............. 313/491 |
| 6,953,925 B2* | 10/2005 | Fang et al. ............... 250/214.1 |
| 2003/0136759 A1* | 7/2003 | Mikolas ....................... 216/26 |
| 2004/0065886 A1* | 4/2004 | Eliashevich et al. .......... 257/79 |

FOREIGN PATENT DOCUMENTS

JP 2001-141910 * 5/2001

OTHER PUBLICATIONS

"Bonding of Microlenses," at http://www.microdrop.de/html/microlenses.html.
"Microlens Arrays, Microlens Array Specifications," Corning Rochester Photonics Corporation.
"Microlens Arrays," at http://www.memsoptical.com/prodserv/products/microlensar.htm.
"Microlens Arrays: 1x N (1D) Microlens Array, M x N (2D) Microlens Arrays," at http://www.corning.com/corningrochesterphotonics/products.
"Microlenses," at http://www.doc.com/products_ind.asp?pid=1.
"The Electromagnetic Spectrum," at http://csep10.phys.utk.edu/astr162/lect/light/spectrum.html.
ODF2002, Tokyo (3rd International Conference on Optics-photonics Design & Fabrication), Oct. 30-Nov. 1, 2002, Abstract for Session TP08.
Craft and Feldblum, "Optical interconnects based on arrays of surface-emitting lasers and lenslets," *Applied Optics*, 1992, 31(11):1735-1739.

(Continued)

*Primary Examiner*—Jordan M. Schwartz
(74) *Attorney, Agent, or Firm*—Fish & Richardson P.C.

(57) ABSTRACT

Microlenses and microlens arrays made from Group III-nitride material.

19 Claims, 7 Drawing Sheets

OTHER PUBLICATIONS

Chen et al., "Design of GaN convex diffractive microlenses," *Optics & Laser Technology*, 2002, 34(7):569-573.

Chen et al., "GaN diffractive microlenses fabricated with gray-level mask," *Optics Communications*, 2003, 215(1-3):75-78.

Daly et al., "The Manufacture of Microlenses by Melting Photoresist," *Microlens Arrays*, 1991, pp. 23-24, IOP Short Meetings Series No. 30, Institute of Physics.

Jiang et al., "III-nitride blue microdisplays," *Applied Physics Letters*, 2001, 78(9):1303-1305.

Hou et al., "Gallium nitride diffractive microlenses used in ultraviolet micro-optics system," *Opt. Rev.*, 2003, 10(4):287-289.

Kim et al., "A Fabrication of GaN Microlens," 1997, *Digest of the IEEE—Leos Summer Topical Meetings*, 1197, 54-55.

Muth et al., "Absorption Coefficient and Refractive Index of GaN, AlN and AlGaN Alloys," MRS Internet J. Nitride Semicond. Res. 4S1, G5.2, 1999.

Oder et al., "Nitride microlens arrays for blue and ultraviolet wavelength applications," *Applied Physics Letters*, 2003, 82(21):3692-3694.

Park et al., "Refractive sapphire microlenses fabricated by chlorine-based inductively coupled plasma etching," *Applied Optics* 2001, 40(22):3698-3702.

Popovic et al., "Technique for monolithic fabrication of microlens arrays," *Applied Optics* 1988, 27(7):1281-84.

Stern and Jay, "Dry etching for coherent refractive microlens arrays," *Optical Engineering*, 1994, 33(11):3547-3551.

Wada, "Ion-Beam Etching of InP and Its Application to the Fabrication of High Radiance InGaAsP/InP Light Emitting Diodes," *J. Electrochem. Soc.: Solid-State Science and Technology*, 1984, 131(10):2373-2379.

Walker and Dineen, "Forming microlenses in various materials using high density plasmas," Oxford Instruments Plasma Technology, UK, 2001.

* cited by examiner

GaN Microlens

GaN Microlens

Fig. 2B

NITRIDE MICROLENS

RELATED APPLICATION

This application claims the benefit of the filing date of U.S. Provisional Application No. 60/471,861, which was filed on May 20, 2003. The contents of U.S. Provisional Application No. 60/471,861 are hereby incorporated by reference in their entirety.

TECHNICAL FIELD

This invention relates to microlenses, and more particularly to microlenses that are made from nitride materials.

BACKGROUND

Microlenses have found use in a variety of applications, including imaging processes, medical devices, laser beam turning, waveguides, optical communication, optical computing for data or computer links, and in opto-electronic devices. Current microlenses allow transmissions in the longer wavelength regions (e.g. visible and infrared wavelength). Microlenses have been made from silicon oxide and sometimes sapphire ($Al_2O_3$).

Nitride-based materials have found utility in semiconductors used in opto-electronic devices. In particular, nitride semiconductors are often used in applications in the green/blue/UV wavelength region. Active devices that are made from nitride-based materials include, for example, light emitting diodes (LEDs), laser diodes (LDs), photodetectors, and transistors.

It would be desirable to provide a microlens that can be used for transmitting a broader range of wavelengths of electromagnetic energy. Microlenses that are durable in challenging environments would also be useful. These microlenses could be integrated with opto-electronic devices such as light emitting diodes (LEDs) and laser diodes (LDs) that have nitride-based semiconductors.

SUMMARY

Microlenses and microlens arrays according to the invention are based on Group III-nitride materials. As used herein, "Group III" represent the elements in the Periodic Classification of Elements Chart that includes Boron (B), Aluminum (Al), Gallium (Ga), Indium (In), and Thallium (Tl), and alloys. In certain embodiments, the microlenses are durable in challenging environments such as higher temperatures and exposure to chemicals and/or radiation.

In one aspect, the invention provides microlenses made from Group III-nitride materials. The microlenses and arrays thereof are transmissive to electromagnetic radiation, particularly in the green through ultra-violet light spectrum.

In another aspect, an embodiment of the invention includes a system having an opto-electric device and a microlens made from Group III-nitride material.

Another aspect of the invention is a method of making microlenses from Group III-nitride materials.

The details of one or more embodiments of the invention are set forth in the accompanying drawings and the description below. Other features, objects, and advantages of the invention will be apparent from the description, drawings, and from the claims.

BRIEF DESCRIPTION OF DRAWINGS

FIG. 2a is a copy of an Scanning Electron Microscopy (SEM) image of the top view of a GaN microlens according to an embodiment of the invention.

FIG. 2b is a copy of an SEM image of a 60° tilt view of a GaN microlens array (area of about 80μ×80 μm) according to an embodiment of the invention.

Like reference symbols in the various drawings indicate like elements.

DETAILED DESCRIPTION

Figure 1:
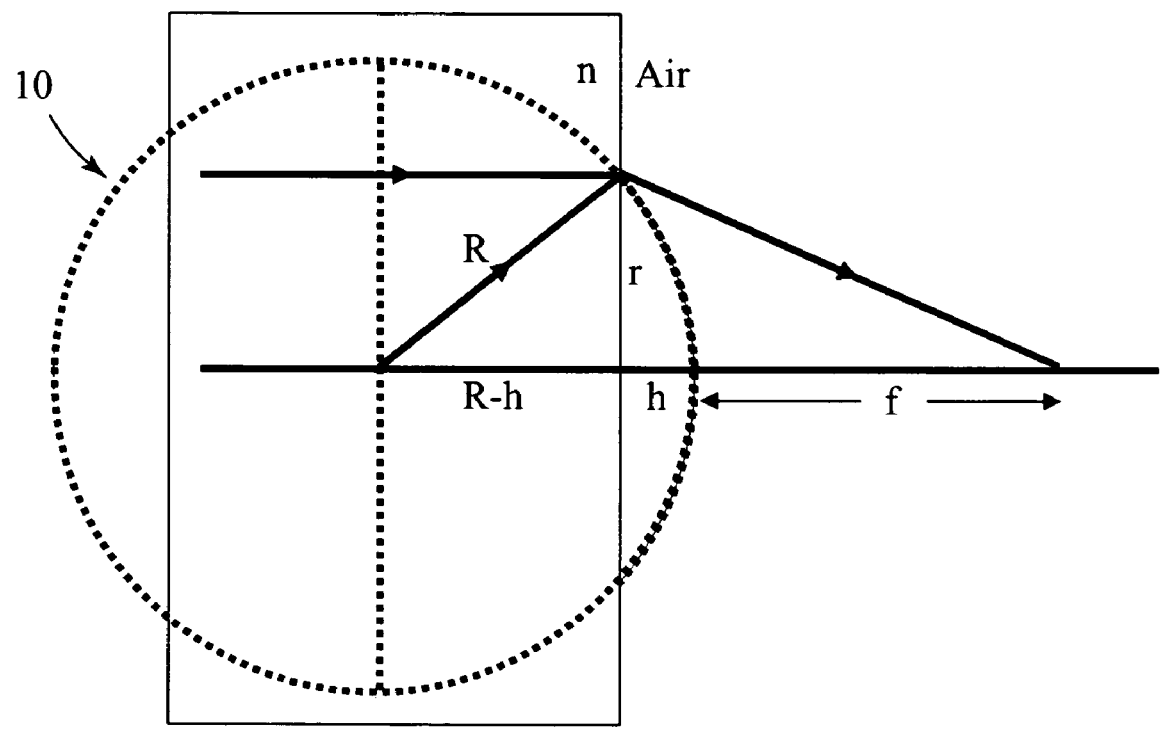
FIG. 1 is a general illustration of a microlens.

The Group III-nitride-based microlens arrays are photonic devices that utilize shorter wavelengths covering green (577 nm)/blue (492 nm) to deep UV (200 nm) region. For example, nitride opto-electronic devices such as blue/UV emitters and detectors can be integrated with nitride microlens arrays.

Microlenses in accordance with embodiments of the invention can be used in many areas, including optical communication, optical computing for data or computer links, and opto-electronic devices such as charge-coupled devices (CCD) arrays. In opto-electronic devices, the microlenses can be used to collect light power to increase sensor sensitivity. Also, microlenses may be used for laser beam shaping/turning, and the microlenses and arrays can be used to focus laser beams to very small spot sizes.

Microelectronic device applications can also utilize certain microlenses of the invention. In an embodiment, a microlens array according to the invention can be used to couple short wavelength light into, out of, and between arrays of Group III-nitride emitters. This is particularly useful for drug identification, labeling, and delivering. Certain microlenses and arrays provide high spatial resolution, while others are useful for light control in bundles of optical fibers. For light controlling applications, the microlenses can be used in spatially-resolved fluorescence spectroscopy studies, such as used in biological and medical systems and optical links. Linear arrays of microlenses can be used for optical coupling between arrayed fiber and arrayed light sources (e.g., LED, LD).

In some embodiments, the nitride-based microlens arrays can achieve monolithic integration of optical elements based on nitride-based semiconductors. For example, easy integration can be achieved between Group III-nitride microlens arrays and nitride micro-size light arrays, without any significant alteration in material properties. Micro-display applications can also take advantage of the arrays, such as in hands-free and high mobility devices, optical communications, computing, and medical research.

Image processing applications can also make use of Group III-nitride microlenses of the invention. Optical parallel processing in optical computing, for example, can be performed by optically matched filter array systems that use planar microlens arrays. Fourier transformed matched filtering based on a Van der Lugt concept is also achievable. Microlenses can also fill certain functions within the photography and high-speed photography industry.

Microlenses and arrays having microlenses are made from materials that include a Group III-nitride compound or a ternary or quaternary alloy thereof. For example, microlenses of InN, GaN, and AlN and alloys thereof can be made. Each microlens is generally dimensioned in the sub-micrometer to sub-millimeter size range. In one embodiment, microlenses can have a diameter of up to several hundred micrometers (μm), while other microlenses can have a diameter of up to about 20 μm or smaller.

Embodiments of the invention are highly durable and have superior physical and chemical properties. The material from which they are made allows them to be useful in applications that may expose them to challenging environments. For example, the Group III-nitride microlenses can be quite capable of withstanding extreme conditions of temperature, chemical, and radiation exposure.

The surface topography of a microlens is a key characteristic, since the lenses are typically used in optical applications. The topography of the microlens can significantly affect the quality of a resultant beam that is transmitted through the microlens. Accordingly, a surface of a microlens is desirably smooth to achieve the intended effect on light. In certain embodiments, a surface of a microlens can have a root-mean-square roughness of less than a few nanometers. Generally, suitable microlenses have a surface roughness of about 10 nm, preferably measured using Atomic Force Microscopy.

The optical properties of microlenses or arrays of microlenses can be optimized according to the application in which they will be implemented. For example, wave front aberrations may not be critical for a microlens that is used to merely to concentrate or focus light that is transmitted through it, while it may be important for microlenses used to amplify a light signal. In general however, microlenses according to the invention can be made and optimized for compatibility with devices or processes that may require superior optical properties. When used as a primary optic element, it is required that the surface topography of the microlens be smooth and spherical in order to maintain, for example, the quality of a focused beam.

Furthermore, for optical applications such as focused light beams, a microlens can be designed in accordance with a desired focal length and beam spot size. A focal length can be measured using a microscope and measuring the distance needed to provide a focused image, where the focal length is the distance between the microlens' surface and the image on which it is being focused. The intensity distribution of light at the focal length of a microlens can be indicative of the microlens' capability. In general, a variety of shapes of a microlens can be made, including profiles that are hemispherical, spherical, aspherical, cylindrical, etc. Additionally, microlenses can have a convex or a concave curvature.

The Group III element used in the nitride-based microlenses can be chosen according to the desired capability (e.g. wavelength transmissivity). GaN microlenses are generally transmissive to electromagnetic radiation having wavelengths greater than 370 nm. For deep UV applications down to 200 nm, AlN microlenses would be desirable.

Articles of Group-III nitride material can be made using techniques that are known to result in smooth surfaces and can be accomplished efficiently, such as high-density plasma etching. The conditions (baking, etching etc.) would be suitable for the nitride and/or the Group III elements. A blue/UV microdisplay or micro-emitter for example, can be fabricated using Group III-nitride alloy (e.g. InGaN/GaN; AlGaN/InGAN) quantum wells based on LED wafers.

Lens formation techniques suitable for making the microlenses of the invention include, for example, ion beam etching or ion milling, dry etching, wet chemical etching, plasma etching, or reactive ion etching. Any of these techniques can be combined with photolithographic techniques to provide microlenses with superior spherical contours.

It is contemplated that a process for making the microlens can be optimized by selecting suitable etching conditions. Optional chemicals (solvents) can be used. Certain chemicals can enhance the smoothness of the lens surface.

A number of embodiments of the invention have been described. Nevertheless, it will be understood that various modifications may be made without departing from the spirit and scope of the invention. The invention will now be described by way of the following non-limiting examples.

Test Methods

Nearfield Scanning Optical Microscopy (NSOM)

Near-field scanning optical microscopy (NSOM) is a type of microscopy where a sub-wavelength light source is used as a scanning probe. The probe is scanned over a surface at a height above the surface of a few nanometers. For this evaluation, a parallel laser beam of wavelength 400 nm was directed to the microlens and the focused emergent laser beam intensity profile was collected by the NSOM probe tip. The distance between the probe tip and microlens was varied to obtained a position at which a maximum amount of intensity in the center of the microlens was detected. In this position, the distance between the microlens and the probe tip gives the focal length.

Scanning Electron Microscopy (SEM)

Scanning Electron Microscopes use a beam of highly energetic electrons to examine objects at a magnification of 10,000× and more. Instead of light, as used by optical microscopes, the focused beam of electrons is used to image the specimen under investigation. The beam does a grid scan across the specimen, with the amount of interaction at each point being displayed as, for example, the brightness of the pixels of a display, with the brighter areas representing a greater number of interactions. This process can be repeated, with the entire pattern able to be scanned at thirty times per second.

Atomic Force Microscopy (AFM)

An atomic force microscope measures topography by using a force probe, rather than lenses. The Atomic Force Microscope operates by measuring the attractive or repulsive forces between the tip of the probe and the specimen. In the repulsive mode, a tip of a probe is touched to the specimen, and the deflection measured. As the specimen is scanned, the vertical height is measured across the sample. In the attractive mode, the tip does not touch the specimen, but the topographic map is created by the displacement of the tip above the specimen. The probe tips are highly sensitive, enabling imaging at atomic resolution.

EXAMPLES

Microlenses of high quality surface profiles as determined by SEM and AFM measurements were produced, as described below in the Examples. The nitride-based microlens arrays having a diameter of 10 μm or less were fabricated on GaN and AlN epilayers using the method of photoresist reflow and inductively coupled plasma (ICP) dry etching. The focal lengths of the microlenses varied from 7–30 μm as determined by theoretical fitting as well as actual measurements performed by Nearfield Scanning Optical Microscopy (NSOM). The theoretical focal lengths showed excellent agreements with the NSOM values. Scanning electron microcopy (SEM) and atomic force microscopy (AFM) were used to obtain the surface profile of the microlenses. Results from AFM matched very well with hemispherical (circular) fitting, showing that the shapes of the microlenses were indeed substantially hemispherical. Surface roughness values were about 1 nm—indicative of good quality GAN epilayers.

Fabrication of Microlenses

GaN and AlN epilayers were grown to a thickness of 3 to 3.5 micrometers (μm) by metallorganic chemical vapor deposition (MOCVD) on sapphire substrates with a corresponding 30 nanometer (nm) GaN or AlN low temperature buffer layer. The sources used were trimethylgallium (TMG), trimethylaluminum (TMAl) and ammonia. In order to fabricate the microlens, a photoresist reflow and dry etching method was used, such as what has been described in Park, S. H. et al., *Appl. Opt.* 40(22) 3698 (2001); Daly, D., et al., *Microlens Arrays*, p. 23, IOP Short Meetings Series No. 30, Institute of Physics, (1991); and Popovic, Z. D., et al., *App. Opt.* 27, 1281 (1988). A thick reflow photoresist layer was spun onto the substrate material and patterned by standard photolithography into cylindrical posts. When subsequently baked, surface tension causes the posts to take up hemispherical shapes. The preformed resist was then used as an etch-mask to transfer the hemispherical shape onto the substrate material. For these samples, an AZ 4260 photoresist was used to pattern an array of circular resist posts of various sizes, which was then baked on a hot plate. For dry etching, an inductively coupled plasma (ICP) etching system with chlorine-based high-density plasma gas was used. The plasma etching was carried on for 7 minutes at 300 watts. The etch conditions were optimized to yield smooth and anisotropic etching of the Group III-nitride materials.

Calculations and Results

Using a hemispherical photoresist etch mask of radius $r_0$, the corresponding microlens formed on the etched material was in general, ellipse shaped, having radius $r_1(x)$, as calculated in formula [1]:

$$r_1(x) = (r_0/k)[1-(1-k^2)(x/r_0)]^{3/2} \quad [1]$$

where x is the distance from the center and k is the etch rate ratio of GaN to the photoresist. The etch rates of GaN and of the photoresist material under these conditions were determined to be 0.65 and 0.7 μm/min respectively, thereby yielding a value for k of about 1. Since the term $(x/r_0)$ is negligible, and k is approximately equal to 1, then the etched microlens was expected to assume a hemispherical shape, with $r_1(x) = r_0/k$ being constant.

FIG. 1 provides an illustration of the physical parameters of a microlens 10. The microlens structure has a radius r, diameter d (d=2r) and height h. The sphere of which the microlens is a part has radius R and diameter D (D=2R). R can be deduced from the measured values of microlens radius r and height h using the simple expression $R^2 = (R-h)^2 + r^2$ giving formula [2]:

$$R = (h^2 + r^2)/2h \quad [2]$$

Alternatively, R can be extracted by first fitting the measured AFM profile using an expression for a circle. Values of R were obtained using these two methods and found to agree to within 1%–3%. This indicated that the etching condition was well optimized to fabricate microlenses of good optical quality.

The focal length f of the plano-convex microlens was estimated using the relation found in formula [3]:

$$f = R/(n-1) \quad [3]$$

where n is the refractive index of the Group III-nitride materials. For example, for GaN, n=2.4 for a wavelength of 470 nm, and for AlN, n=2.1 for a wavelength of 280 nm. The wavelength value of 280 nm is of significance in applications for the detection of biological and chemical agents where the Group III-nitride based optical elements can be used.

Figures 2A, 2B:
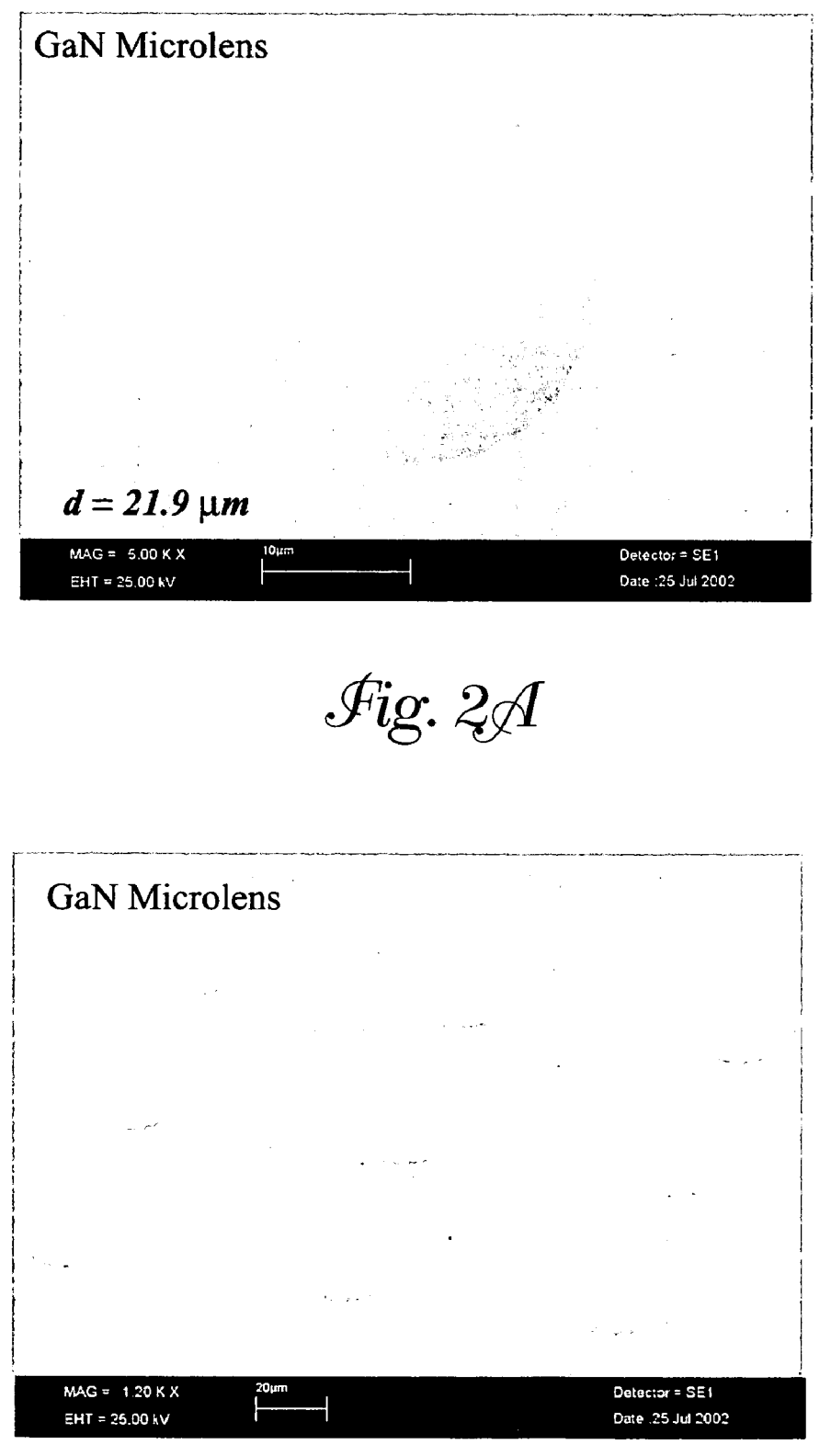

FIG. 2(a) illustrates the top view of an SEM image of a GaN microlens of diameter d=21.9 μm. FIG. 2(b) illustrates the GaN microlenses in an array of about 80 μm×80 μm at 60° tilt view.

Figure 5A:
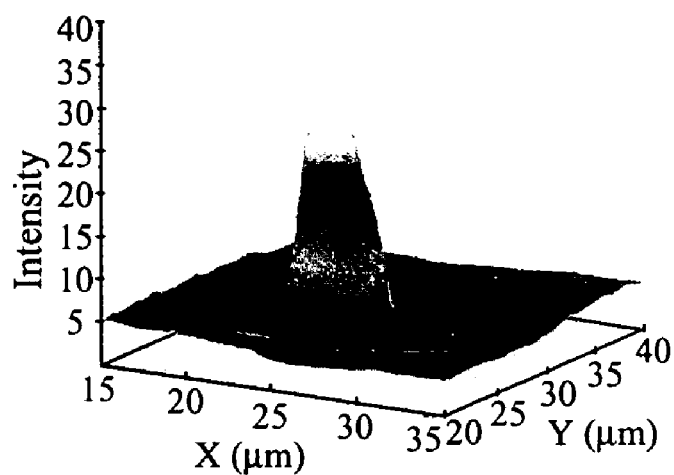
FIG. 5a is a NSOM beam profile, with the probe tip at a height of 5.2 μm above the microlens surface.
Figure 5B:
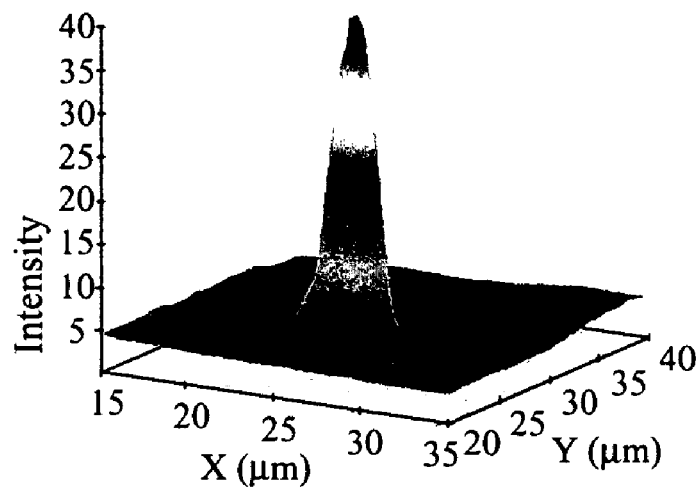
FIG. 5b is a NSOM beam profile, with the probe tip at a height of 7.3 μm above the microlens surface.
Figure 5C:
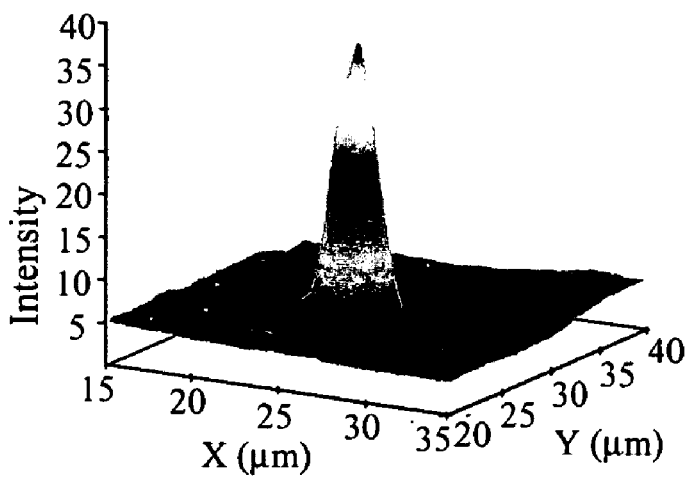
FIG. 5c is a NSOM beam profile, with the probe tip at a height of 9.4 μm above the microlens surface.

To verify the calculated focal lengths of the microlens, NSOM measurement was used to determine the focal length of a GaN microlens which had a diameter (d) of 10.8 μm, height (h) of 1.6 μm, and a theoretical focal length of 7.0 μm. FIGS. 5a, 5b, and 5c show the laser beam intensity profile when the probe tip was at three different heights above the microlens: 5.2 μm, 7.3 μm, and 9.4 μm height, respectively. The focal length was determined to be about 7.3 μm. Compared to the calculated value for the focal length (7.0 μm), there was no significant difference between the calculated value and the actual value, thus indicating that the resulting microlens was of good quality.

Table 1 provides the values for measured parameters of several GaN and AlN microlenses. The microlens radius (r) and height (h) were measured by AFM while spherical radius (R) was obtained using the methods explained above. The focal length (f) was calculated at wavelength λ=470 nm for GaN, and at wavelength λ=280 nm for AlN.

TABLE 1

| GaN | | | | AlN | | | |
|---|---|---|---|---|---|---|---|
| r (μm) | h (μm) | R (μm) | f (μm) | r (μm) | h (μm) | R (μm) | f (μm) |
| 5.4 | 1.6 | 9.8 | 7.0 | 5.8 | 1.2 | 14.9 | 13.6 |
| 6.0 | 1.0 | 18.0 | 12.9 | 6.1 | 1.1 | 17.8 | 16.2 |
| 5.5 | 1.2 | 12.5 | 9.0 | 8.3 | 1.3 | 24.6 | 22.4 |
| 6.1 | 0.6 | 32.2 | 23.0 | 8.5 | 2.5 | 15.2 | 13.8 |
| 9.4 | 3.0 | 15.4 | 11.0 | 10.1 | 2.5 | 20.9 | 19.0 |
| 11.6 | 1.7 | 42.6 | 30.4 | | | | |

Figure 3B:
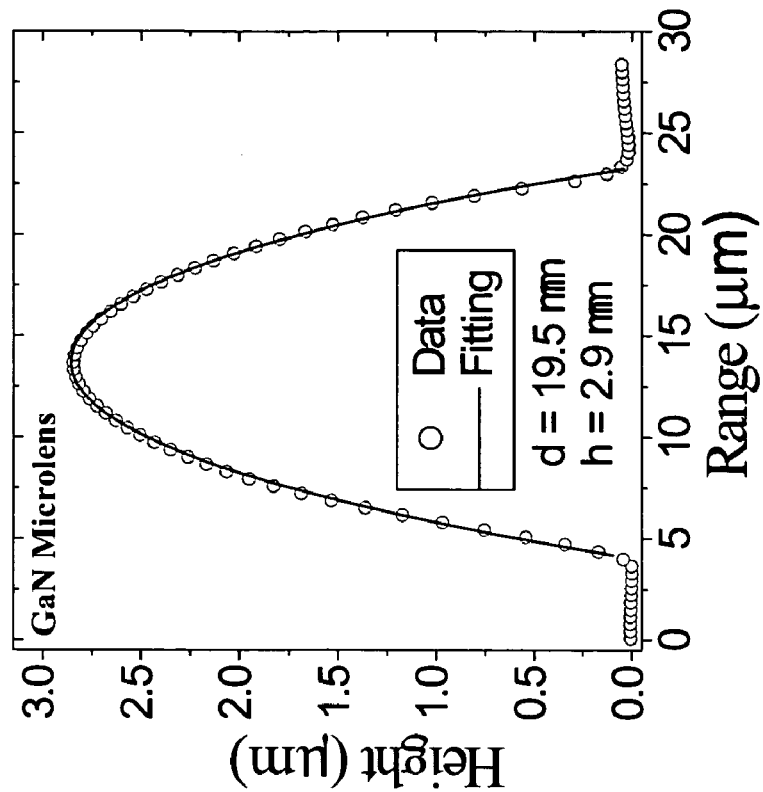
FIG. 3b is an AFM profile of a GaN microlens as described in Example 1.
Figure 3A:
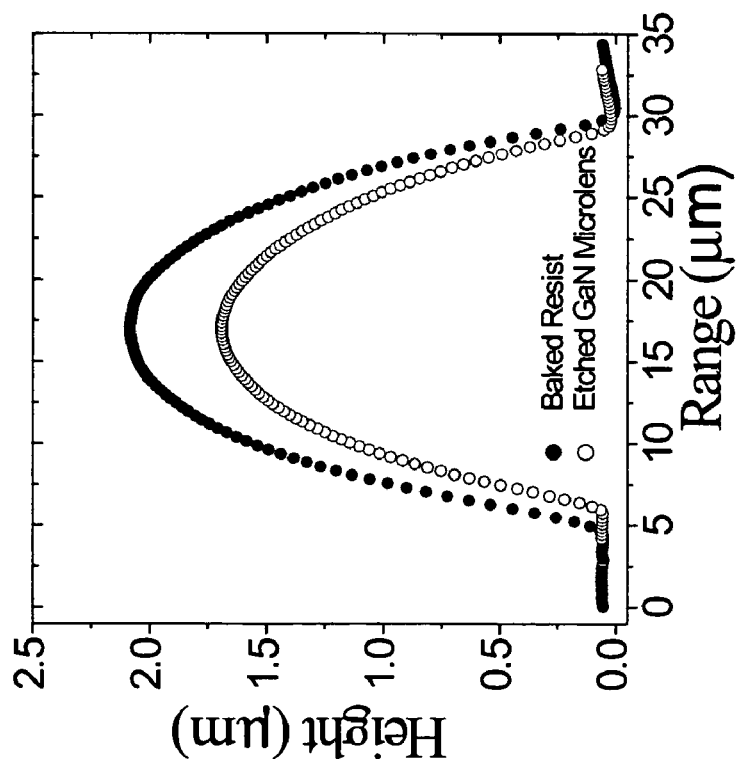
FIG. 3a is an Atomic Force Microscopy (AFM) line profile of a baked photoresist as described in Example 1.

FIG. 3(a) provides an AFM line profile of the height of the baked photoresist prior to etching and that of the resulting GaN microlens after etching. It was observed that dry etching produced a hemispherical microlens similar in shape to the preformed photoresist mask although with a slightly reduced height.

Referring to FIG. 3(b), the surface profile of a GaN microlens is shown with a circular fitting. The microlens was determined to have a diameter (d) of 19.5 μm and a height (h) of 2.9 μm. It was therefore noted that the fabricated microlens could be fitted very well to a spherical shape, where the sphere would have a diameter (D) of 35.2 μm.

Figure 3C:
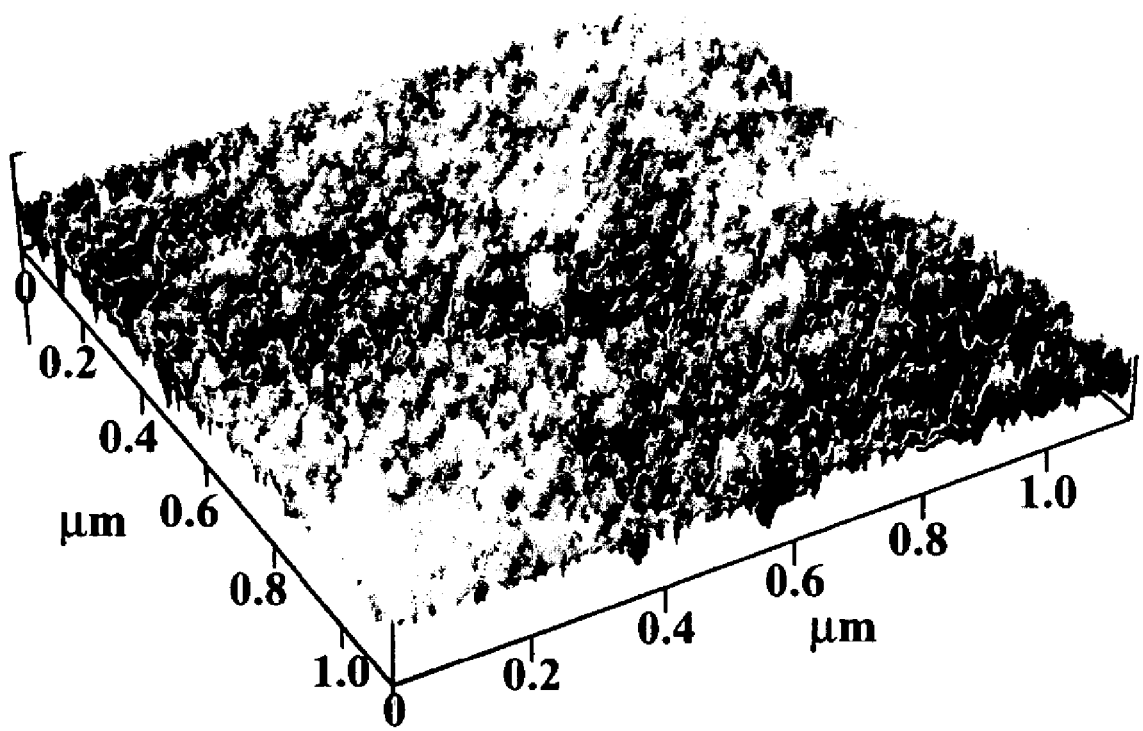
FIG. 3c is an AFM surface profile of a GaN microlens made as described in Example 1.

To determine the smoothness of the microlens surface, an AFM profile of GaN microlens was determined, as shown in FIG. 3(c), and a root-mean-square roughness value of 1.1 nm was obtained for a 1 μm×1 μm scanned area. This value was very close to that of the as-grown GaN epilayers. Thus, desirable levels of smoothness in the surface/topography of the microlenses were achieved and indicate that the microlenses were of high optical quality.

Figure 4A:
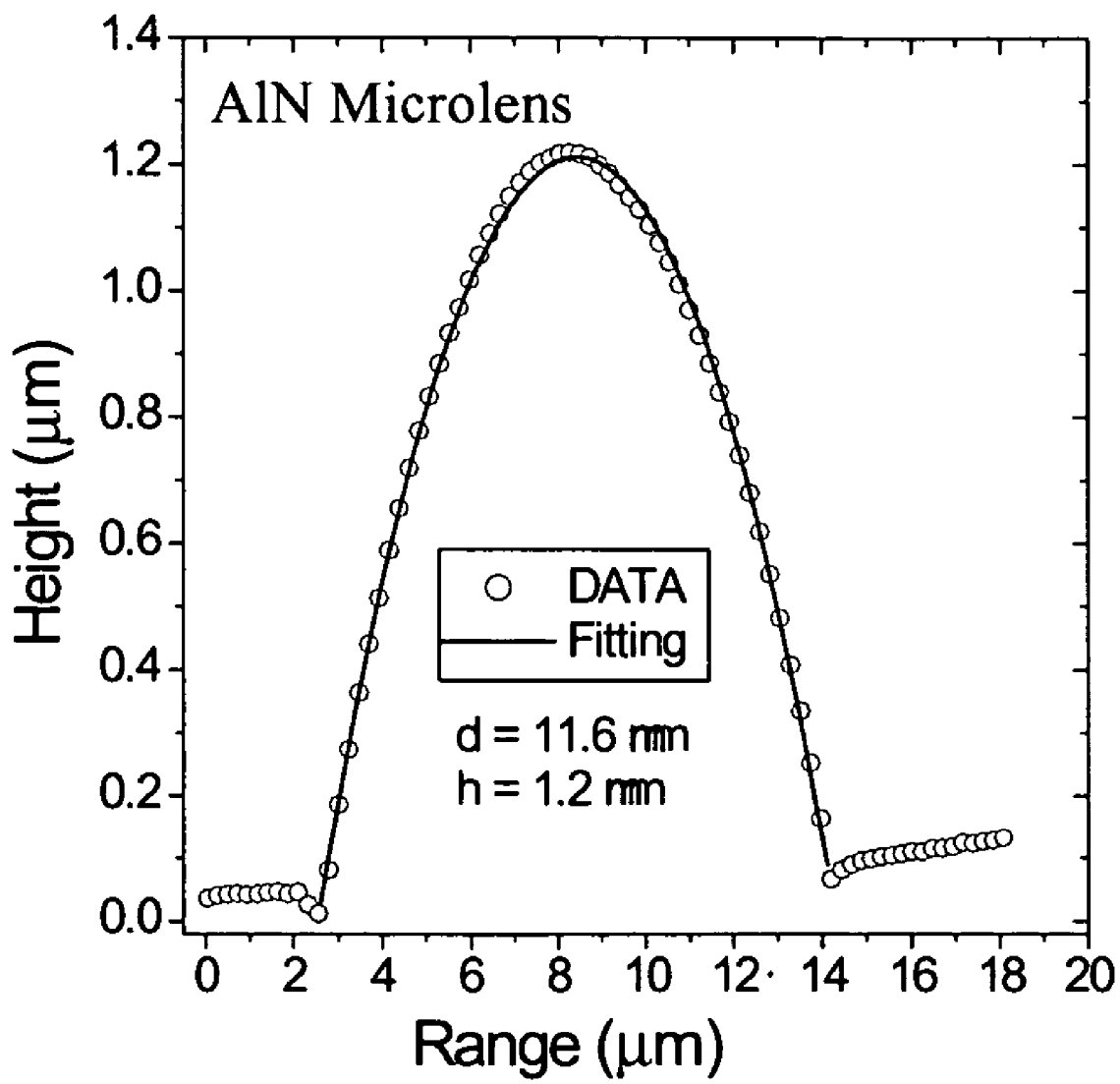
FIG. 4a is an AFM line profile of AlN microlens
Figure 4B:
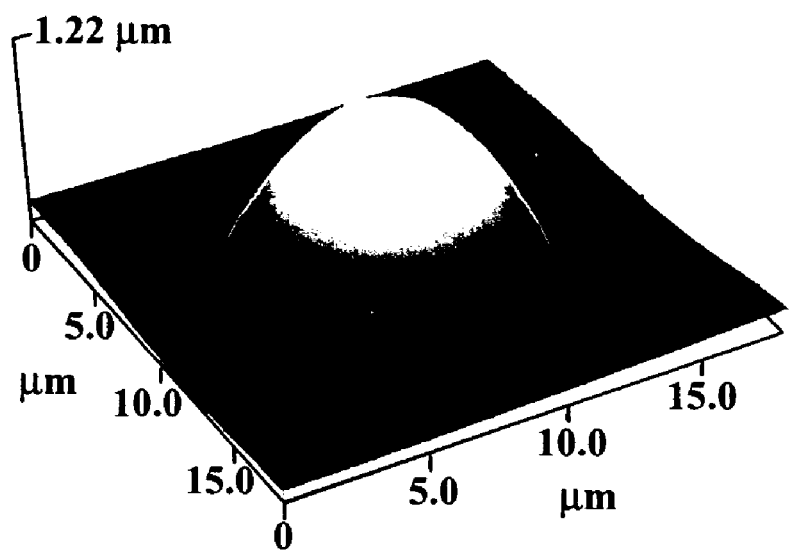
FIG. 4b is a three-dimensional illustration of an AlN microlens
Figure 4C:
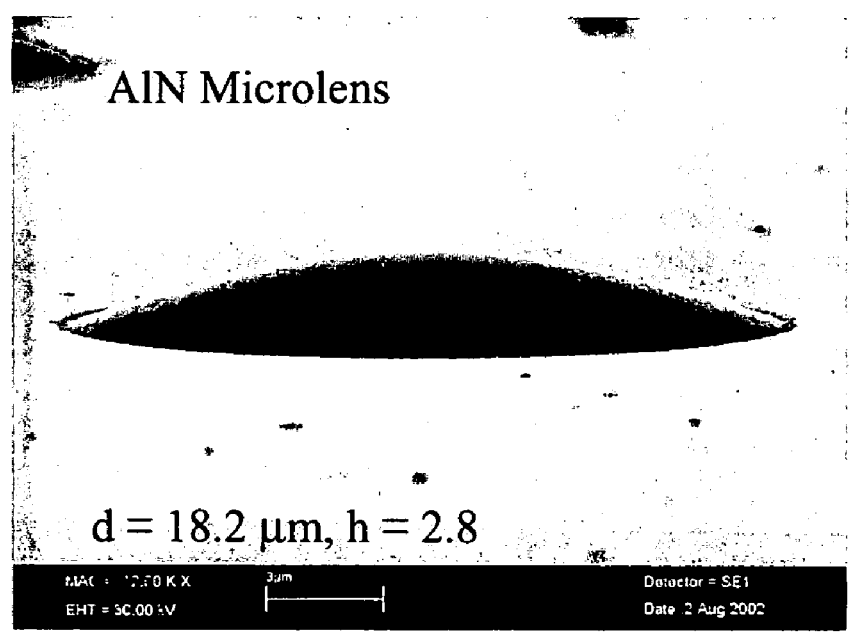
FIG. 4c is a copy of an SEM image of an AlN microlens made as described in Example 1.

In FIG. 4(a), an AFM profile of an AlN microlens with a circular fitting is provided. The microlens fits well with a spherical surface profile, having a diameter (d) of about 11.6 µm and a height (h) of 1.2 µm. The fitting indicated that the microlens would be part of a sphere having a diameter (D) of 30 µm. A three-dimensional AFM profile of the AlN microlens is provided in FIG. 4(b), while a SEM image of the AlN microlens is shown in FIG. 4(c).

What is claimed is:

1. A microlens, comprising a refractive property and a primary microlens material, wherein the continuous phase of the primary microlens material comprises a ternary or a quaternary alloy of a Group III-nitride.

2. The microlens of claim 1, wherein the microlens exhibits transmissivity to electromagnetic radiation.

3. The microlens of claim 1, wherein the microlens is transmissive to light within the green to blue spectrum.

4. The microlens of claim 1, wherein the microlens is transmissive to ultraviolet light.

5. The microlens of claim 1, wherein the microlens is substantially integratable with nitride-based opto-electronic devices.

6. A system, comprising:
an opto-electronic device; and
at least one microlens according to claim 1.

7. The system of claim 6, wherein said opto-electronic device comprises nitride-based material.

8. The system of claim 6, wherein said opto-electronic device comprises Group III nitride-based material.

9. The microlens of claim 1, wherein the microlens is formed of a nitride material comprising Al, Ga, and N.

10. The microlens of claim 1, wherein the microlens is formed of a nitride material comprising In, Ga, and N.

11. A microlens array, comprising at least one microlens according to claim 1.

12. The microlens of claim 1, wherein the microlens comprises one or more epilayers of the ternary or the quaternary alloy of a Group III-nitride.

13. The microlens of claim 6, wherein the microlens comprises one or more epilayers of the ternary or the quaternary alloy of a Group III-nitride.

14. A microlens, comprising a refractive property and a primary microlens material, wherein the continuous phase of the primary microlens material comprises InN or alloys thereof, and wherein the microlens comprises one or more epitaxially grown epilayers of InN or alloys thereof.

15. A microlens array, comprising at least one microlens according to claim 14.

16. A system, comprising:
an opto-electronic device; and
at least one microlens according to claim 14.

17. A microlens, comprising a refractive property and a primary microlens material, wherein the continuous phase of the primary microlens material comprises AlN or alloys thereof, and wherein the microlens comprises one or more epitaxially grown epilayers of AlN or alloys thereof.

18. A microlens array, comprising at least one microlens according to claim 17.

19. A system, comprising:
an opto-electronic device; and
at least one microlens according to claim 18.

* * * * *

UNITED STATES PATENT AND TRADEMARK OFFICE
CERTIFICATE OF CORRECTION

| | | |
|---|---|---|
| PATENT NO. | : 7,193,784 B2 | Page 1 of 1 |
| APPLICATION NO. | : 10/850524 | |
| DATED | : March 20, 2007 | |
| INVENTOR(S) | : Hongxing Jiang, Tom N. Oder and Jingyu Lin | |

It is certified that error appears in the above-identified patent and that said Letters Patent is hereby corrected as shown below:

Col. 1, line 3, Statement as to Federally Sponsored Research, please insert the entire paragraph;

--STATEMENT AS TO FEDERALLY SPONSORED RESEARCH

Funding for the work described herein was provided in part by the Army Research Office, grant no. DAAD19-00-1-0410, grant no. DARPA: N66001-01-1-8936, grant no. DARPA: N00014-02-1-0565, and grant no. NSF: DMR-9902431. The federal government may have certain rights in the invention.--therefor.

Signed and Sealed this

Twenty-fifth Day of December, 2007

JON W. DUDAS
*Director of the United States Patent and Trademark Office*